(12) United States Patent
Tashiro

(10) Patent No.: US 8,265,713 B2
(45) Date of Patent: Sep. 11, 2012

(54) SYSTEM AND METHOD FOR ADAPTIVELY HANDLING SOFTWARE PROCESSING DURING POWER SAVE MODE OPERATION IN MOBILE TERMINALS

(75) Inventor: Yuko Tashiro, Tokyo (JP)

(73) Assignee: NEC Corporation, Tokyo (JP)

( * ) Notice: Subject to any disclaimer, the term of this patent is extended or adjusted under 35 U.S.C. 154(b) by 430 days.

(21) Appl. No.: 12/281,383

(22) PCT Filed: Feb. 1, 2007

(86) PCT No.: PCT/JP2007/051691
§ 371 (c)(1),
(2), (4) Date: Sep. 2, 2008

(87) PCT Pub. No.: WO2007/099731
PCT Pub. Date: Sep. 7, 2007

(65) Prior Publication Data
US 2009/0011791 A1    Jan. 8, 2009

(30) Foreign Application Priority Data

Mar. 3, 2006    (JP) .................................. 2006-057474

(51) Int. Cl.
*H04B 1/38* (2006.01)
(52) U.S. Cl. ..................... 455/574; 455/414.1; 455/418; 718/103; 718/104; 713/323
(58) Field of Classification Search .................. 713/323; 455/575.3, 574, 414.1, 418; 718/103, 104
See application file for complete search history.

(56) References Cited

U.S. PATENT DOCUMENTS

| 6,751,742 B1 | 6/2004 | Duhault et al. | |
|---|---|---|---|
| 2002/0049765 A1* | 4/2002 | Aruga | 707/100 |
| 2004/0073824 A1* | 4/2004 | Machida | 713/323 |
| 2005/0144237 A1* | 6/2005 | Heredia et al. | 709/206 |

FOREIGN PATENT DOCUMENTS

| JP | 08054949 A | 2/1996 |
|---|---|---|
| JP | 10171564 A | 6/1998 |
| JP | 2002101192 A | 4/2002 |
| JP | 2004343611 A | 12/2004 |
| JP | 2006005863 A | 1/2006 |
| WO | 02065263 A | 8/2002 |

OTHER PUBLICATIONS

Japanese Office Action for JP 2008-502677 issued Apr. 14, 2009.
International Search Report for PCT/JP2007/051691 mailed Apr. 24, 2007.
Japanese Office Action for JP2009-046760 issued May 6, 2011.
Supplementary European Search Report for EP 07 70 7877 issued Nov. 18, 2011.

* cited by examiner

*Primary Examiner* — Jean Gelin
*Assistant Examiner* — Quan Hua

(57) ABSTRACT

A controller (101) of a mobile telephone (100) executes an application program, checks a program stop permission flag of the application program being executed when shifting to a power-saving mode, and determines whether to continue or temporarily stop the execution of the application program being executed. If the temporary stop condition of the application program being executed is met, the controller (101) rewrites the program stop permission flag of the application program to a value permitting stop of program execution.

6 Claims, 4 Drawing Sheets

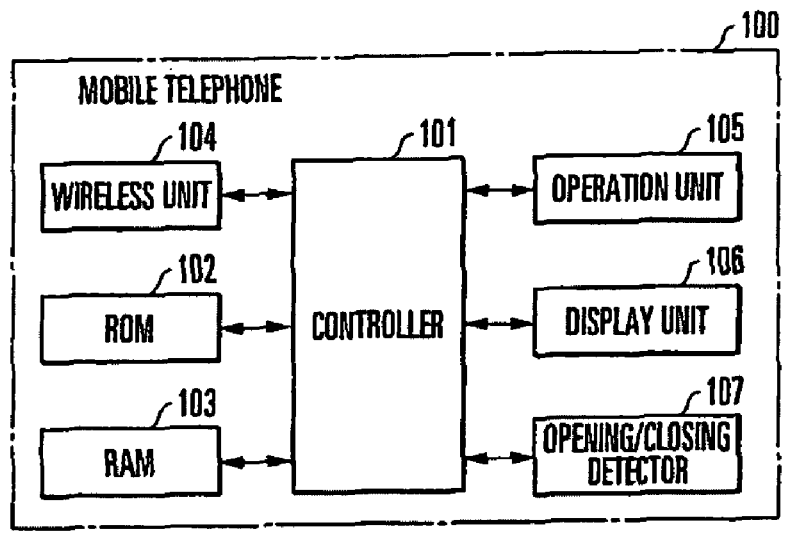
F I G. 1
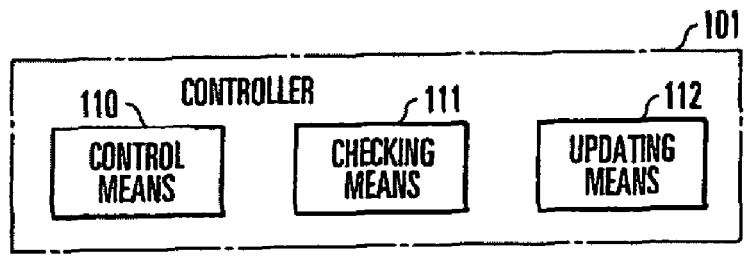
F I G. 2
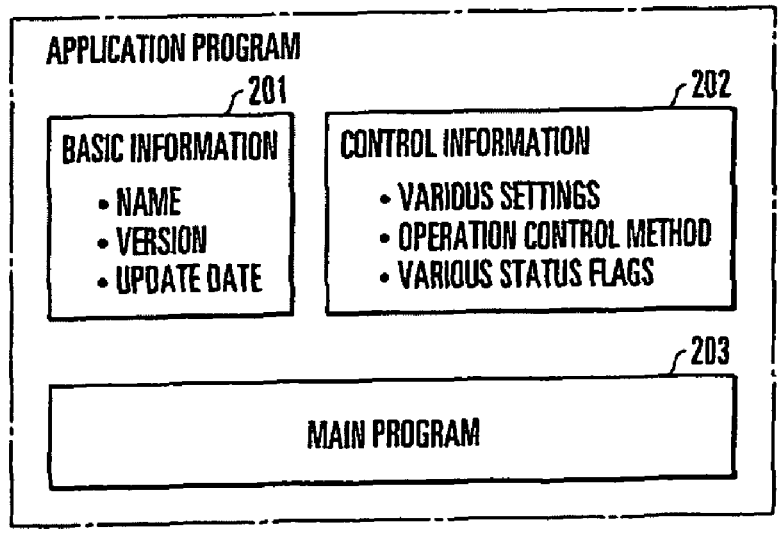
F I G. 3

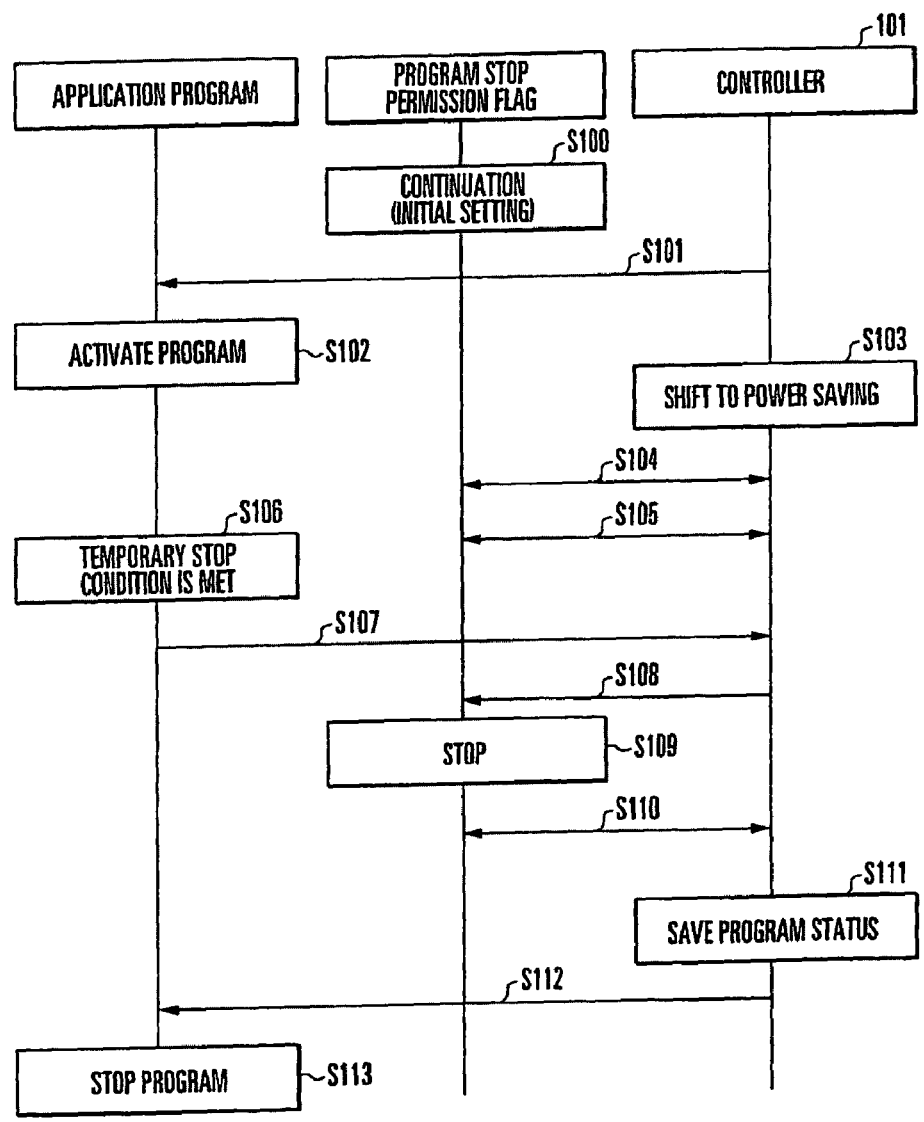
F I G. 5

SYSTEM AND METHOD FOR ADAPTIVELY HANDLING SOFTWARE PROCESSING DURING POWER SAVE MODE OPERATION IN MOBILE TERMINALS

TECHNICAL FIELD

The present invention relates to a mobile telephone and, more particularly, to a technique of controlling the operation of an application program.

BACKGROUND ART

Conventionally, a mobile telephone is driven by a battery and hence is required to efficiently operate and minimize the power consumption. Conventional mobile telephones have achieved power-saving control by detecting the opening/closing of a housing or a non-operation state for a predetermined time or more. For example, the power supply of the screen of a foldable mobile telephone can be shut down by detecting the closing of a housing by an opening/closing detecting means.

Recently, the multifunction capability and performance of mobile telephones are more and more advancing, and various application programs are provided and usable across networks in addition to application programs originally installed in the mobile telephones. Since, however, various application programs are provided, the power is wasted or the user friendliness worsens if these application programs are controlled in accordance with only the state of a mobile telephone as described above.

For example, if it is unconditionally set that a program is not stopped even when the housing of a mobile telephone is closed, the power supply of the screen is shut down but the execution of a program is continued when the housing is closed while the program is waiting for a user's operation. Accordingly, the CPU unnecessarily continues the operation and wastes the power.

On the other hand, if it is unconditionally set that a program is stopped when the housing of a mobile telephone is closed, the processing of a program that automatically executes a calculation and outputs the result after a user's operation stops when the housing is closed, so the user must wait until the processing is complete when he or she opens the housing again and checks the result. As an example, a program such as a roll playing game that automatically advances the processing for a while after a user's operation causes the user to wait until he or she can input the next operation, and the user sometimes closes the housing and waits. In this case, if the program stops when the housing is closed, the user must wait until he or she can input an operation again when the housing is opened.

Japanese Patent Laid-Open No. 2004-343611 has disclosed a mobile communication terminal that gives an application program setting data indicating whether the program is non-resident, resident, or continuous resident. When the housing of this mobile communication terminal is closed, an application program being executed is temporarily stopped if the program is non-resident or resident, and the execution is continued if the program is non-resident. Accordingly, the mobile communication terminal disclosed in patent reference 1 can execute an application program in accordance with the type of the program.

DISCLOSURE OF INVENTION

Problem to be Solved by the Invention

In the mobile communication terminal disclosed in patent reference 1, however, the setting data set by the developer of an application program cannot be rewritten. Therefore, even in a situation in which it is unnecessary to execute a continuous resident application program, the CPU unnecessarily continues the operation and wastes the power. That is, there is a situation in which even a continuous resident application program need not be always executed and can be temporarily stopped. With the housing being closed, however, the mobile communication terminal disclosed in patent reference 1 continues the execution of a continuous resident application program regardless of whether the execution is necessary. Consequently, the power consumption increases when a continuous resident application program is downloaded in this mobile communication terminal.

The present invention has been made to solve the above problem, and has as its object to provide a mobile telephone and application program capable of appropriately stopping, in accordance with the situation, a continuous resident application program that is preferably continuously executed even when the mobile telephone has shifted to a power-saving mode.

Means for Solving the Problem

A mobile telephone of the present invention comprises control means for executing an application program, checking means for checking a program stop permission flag of the application program being executed when shifting to a power-saving mode, and updating means for rewriting the program stop permission flag of the application program being executed to a value permitting stop of program execution, if a temporary stop condition of the application program is met, wherein the control means determines whether to continue or temporarily stop the execution of the application program being executed, in accordance with the value of the program stop permission flag checked by the checking means.

EFFECTS OF THE INVENTION

As explained above, the present invention gives an application program the program stop permission flag, and can optimally control the operation of the application program in accordance with the type of the program. This makes it possible to suppress unnecessarily power consumption, and improve the user friendliness. Also, even when the mobile telephone has shifted to a power-saving mode, the present invention can continue the execution of a program if it is favorable to continuously execute the program processing. Therefore, the user need not unnecessarily wait for the operation of the program. In addition, the present invention updates the program stop permission flag when the temporary stop condition is met during the execution of a program for which the program stop permission flag is set at a value indicating continuation, thereby temporarily stopping the application program. As a consequence, the power consumption can be suppressed.

BRIEF DESCRIPTION OF DRAWINGS

FIG. 1 is a block diagram showing the arrangement of a mobile telephone according to the first exemplary embodiment of the present invention;

FIG. 2 is a block diagram showing the arrangement of a controller of the mobile telephone according to the first exemplary embodiment of the present invention;

FIG. 3 is a view showing the structure of an application program according to the first exemplary embodiment of the present invention;

FIG. 5 is a sequence diagram showing the processes of activation and temporary stop of an application program according to the first exemplary embodiment of the present invention.

BEST MODE FOR CARRYING OUT THE INVENTION

Figure 4:
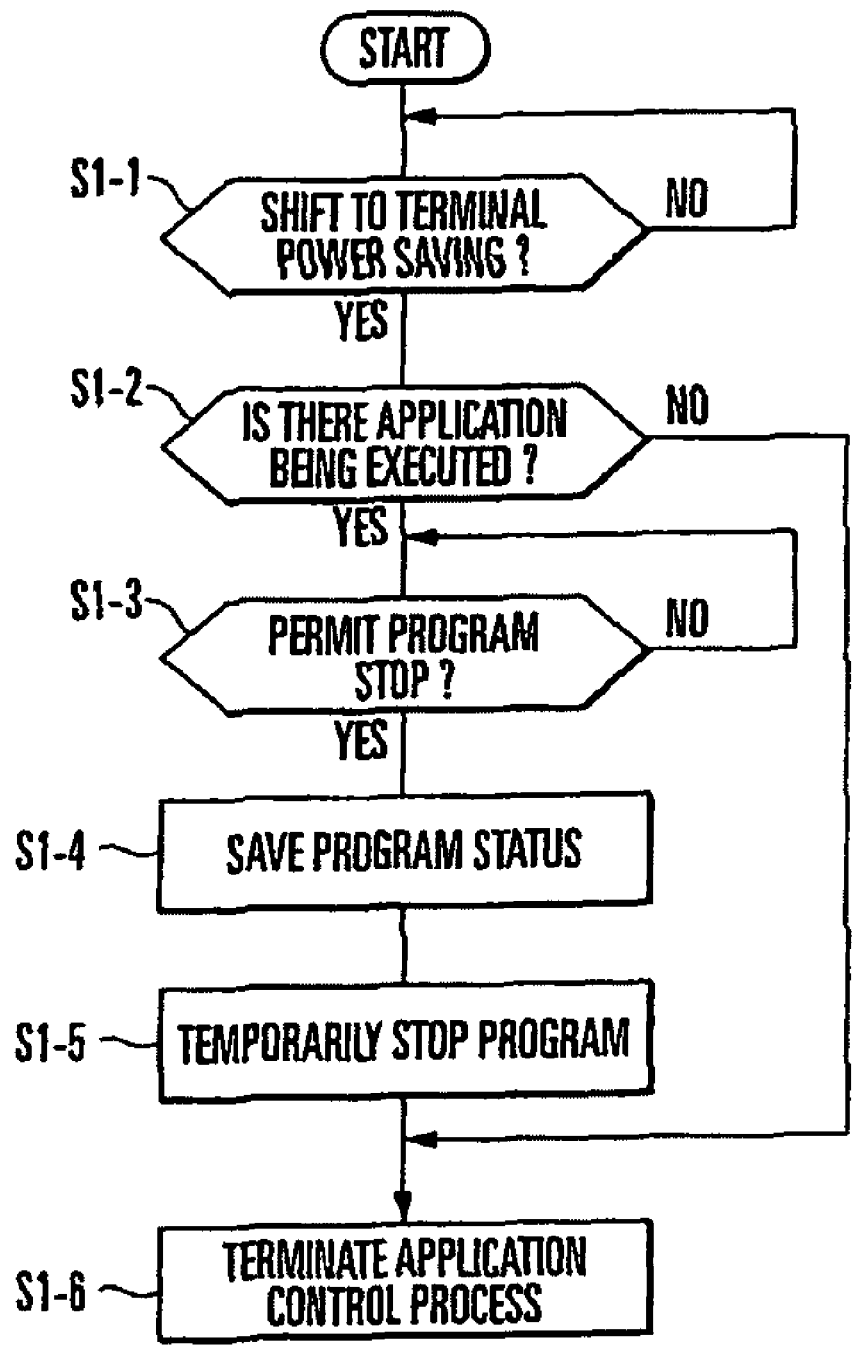
FIG. 4 is a flowchart showing the operation of the mobile telephone when the housing is closed during the execution of an application program according to the first exemplary embodiment of the present invention.

In the present invention, an application program to be downloaded into a mobile telephone has a program stop permission flag as a part of control information necessary to execute the application program on the mobile telephone. The program stop permission flag is a status determination flag for setting whether to stop the execution of the application program when the housing of a foldable mobile telephone is closed.

When the housing of the mobile telephone is closed, a controller of the mobile telephone detects the closing of the housing, and performs a power-saving mode shifting process of, e.g., shutting down the power supply of a display unit. If an application program in operation exists, the controller checks the program stop permission flag of the application program in operation. If the program stop permission flag is "stop", the controller saves the status of the application program, and performs the process of temporarily stopping the program. If the program stop permission flag is "continuation", the controller continues the operation of the program. This makes it possible to determine whether to stop or continue the execution of an application program in accordance with the program stop permission flag.

Also, the controller of the mobile telephone can update the program stop permission flag any time in accordance with the execution condition of an application program. Accordingly, even when it is basically desirable to continue the execution of an application program regardless of the opening/closing of the housing, if the necessity for the execution is low, the controller can temporarily stop the execution of the program by setting the program stop permission flag to "stop", thereby suppressing the power consumption.

[First Exemplary Embodiment]

Exemplary embodiments of the present invention will be explained below with reference to the accompanying drawings. As shown in FIG. 1, a mobile telephone 100 has a controller 101 including, e.g., a CPU for controlling individual parts, a ROM (Read Only Memory) 102, a RAM (Random Access Memory) 103, a wireless unit 104, an operation unit 105, a display unit 106, and an opening/closing detector 107. The individual parts of the mobile telephone 100 shown in FIG. 1 are arranged inside a housing (not shown) foldable into two pieces.

The controller 101 executes processing in accordance with programs stored in the ROM 102 or RAM 103. As shown in FIG. 2, the controller 101 comprises a control means 110 for executing the programs, a checking means 111 for checking the program stop permission flag of an application program being executed when shifting to a power-saving mode, and an updating means 112 for rewriting, if the temporary stop condition of an application program being executed is met, the program stop permission flag of the application program to a value permitting stop of program execution.

The ROM 102 stores control programs for implementing the basic functions, e.g., the communication function and screen display function of the mobile telephone 100, application programs addable by the user, and the like. Control information is added to each program. The controller 101 expands a program stored in the ROM 102 onto the RAM 103, and executes the program.

The controller 101 can connect to a wireless network via the wireless unit 104, and achieves voice communication or information communication with another terminal device across the wireless network.

The user can input various kinds of information to the controller 101 of the mobile telephone 100 by operating the operation unit 105.

The display unit 106 displays a voice communication originating screen, information obtained from the wireless network, the execution result of an application program, and the like. That is, the display unit 106 implements functions related to display among the functions of the mobile telephone 100.

The opening/closing detector 107 detects the opening/closing of the housing of the foldable mobile telephone 100, and transmits opening/closing information indicating the detected opening/closing state to the controller 101.

The operation of the mobile telephone 100 of this exemplary embodiment will be explained below. As shown in FIG. 3, an application program comprises basic information 201 such as the name and version of the program, control information 202 concerning control of the mobile telephone main body, e.g., indicating whether to use the communication function of the mobile telephone 100, and a main program 203 as the program main body for implementing the application operation.

The application program of this exemplary embodiment can store, as the control information 202, setting contents indicating whether to stop or continue the execution of the program when an operation such as an operation of closing the housing is performed. In this exemplary embodiment as described previously, the control information 202 like this is called a program stop permission flag. A value indicating "stop" is set as the program stop permission flag of a program to be stopped when, e.g., an operation of closing the housing is performed. A value indicating "continuation" is set as the program stop permission flag of a program to be continuously executed when, e.g., an operation of closing the housing is performed. Note that either value can be set as the program stop permission flag when it is stored in the ROM 102. The set value of the program stop permission flag when the program is saved is the initial value.

An operation of executing a program on the mobile telephone 100 will be explained below. The user gives instructions to the controller 101 by operating the operation unit 105. In accordance with the user's instructions, the controller 101 causes the display unit 106 to display application programs stored in the ROM 102. The user selects a desired application program from those displayed on the display unit 106 by operating the operation unit 105. The controller 101 loads the basic information 201, control information 202, and main program 203 of the selected application program into the RAM 103, and executes the application program. The application program is controlled by the control information 202 stored in the RAM 103, and user's instructions input from the operation unit 105.

An operation when the housing of the mobile telephone 100 is closed during the execution of an application program will be explained below with reference to FIG. 4.

When the housing of the mobile telephone 100 is closed, the opening/closing detector 107 of the mobile telephone 100 sends information indicating that the housing is closed to the controller 101 (YES in step S1-1). The controller 101 having received this information from the opening/closing detector 107 checks information of an application program being executed stored in the RAM 103 (step S1-2). If there is no application program being executed, the controller 101 terminates the application program control process (step S1-6).

If there is an application program being executed, the controller 101 checks the program stop permission flag of the application program stored in the RAM 103 (step S1-3). If the program stop permission flag has a value indicating "stop" (YES in step S1-3), the controller 101 saves the status such as the execution result of the application program in the RAM 103 (step S1-4), and performs a process of temporarily stopping the application program (step S1-5).

On the other hand, if the program stop permission flag has a value indicating "continuation" (NO in step S1-3), the controller 101 continues the execution of the application program. The controller 101 checks the program stop permission flag again (step S1-3), and performs the process of temporarily stopping the application program in the same manner as above if the program stop permission flag has the value indicating "stop" (steps S1-4 and S1-5). If the housing of the mobile telephone 100 remains closed, the controller 101 repeats the determination in step S1-3 until the program stop permission flag becomes "stop".

FIG. 5 is a sequence diagram showing the above-mentioned processes of activating and temporarily stopping an application program. As described previously, the program stop permission flag is initially set at the value indicating "continuation" (step S100). The controller 101 loads an application program selected by the user into the RAM 103 and executes the application program (step S101), thereby activating the application program (step S102).

When the housing of the mobile telephone 100 is closed (step S103 and step S1-1 of FIG. 4), the controller 101 checks the program stop permission flag of the application program being executed (steps S104 and S105, and step S1-3 of FIG. 4). Since the program stop permission flag has the value indicating "continuation", the controller 101 repetitively checks the program stop permission flag.

If the temporary stop condition of the application program being executed is met (step S106), the application program notifies the controller 101 that the temporary stop condition is met (step S107). When the temporary stop condition of the application program being executed is met, the controller 101 updates the value of the program stop permission flag of the application program from "continuation" to "stop" (steps S108 and S109). The temporary stop condition is met when, for example, the processing has advanced to a preset point.

When the updated program stop permission flag is checked (step S110), the program stop permission flag has the value indicating "stop". Therefore, the controller 101 saves the status of the application program in the RAM 103 (step S111 and step S1-4 of FIG. 4), and performs the process of temporarily stopping this application program (step S112 and step S1-5 of FIG. 4). In this way, the application program stops.

In this exemplary embodiment as described above, an application program is given the program stop permission flag. Therefore, the operation of an application program can be optimally controlled in accordance with the type of the application program. This makes it possible to suppress unnecessary power consumption, and improve the user friendliness. Also, in this exemplary embodiment, even when the housing of the mobile telephone 100 is closed, the execution of a program can be continued if it is desirable to continue the execution of the program processing. Accordingly, the user need not unnecessarily wait for the operation of the program. Furthermore, in this exemplary embodiment, when it becomes unnecessary to continue the execution of a program having a program stop permission flag indicating "continuation" while the program is being executed, it is determined that the temporary stop condition is met. Therefore, the program stop permission flag is updated, and the application program is temporarily stopped. This makes it possible to suppress the power consumption.

Note that when the housing of the mobile telephone 100 is opened and an application program having a program stop permission flag indicating "stop" is selected and executed again by the user, the controller 101 updates the value of the program stop permission flag of this application program from "stop" to "continuation", thereby returning the program stop permission flag to the original value.

[Second Embodiment]

Figure 6:
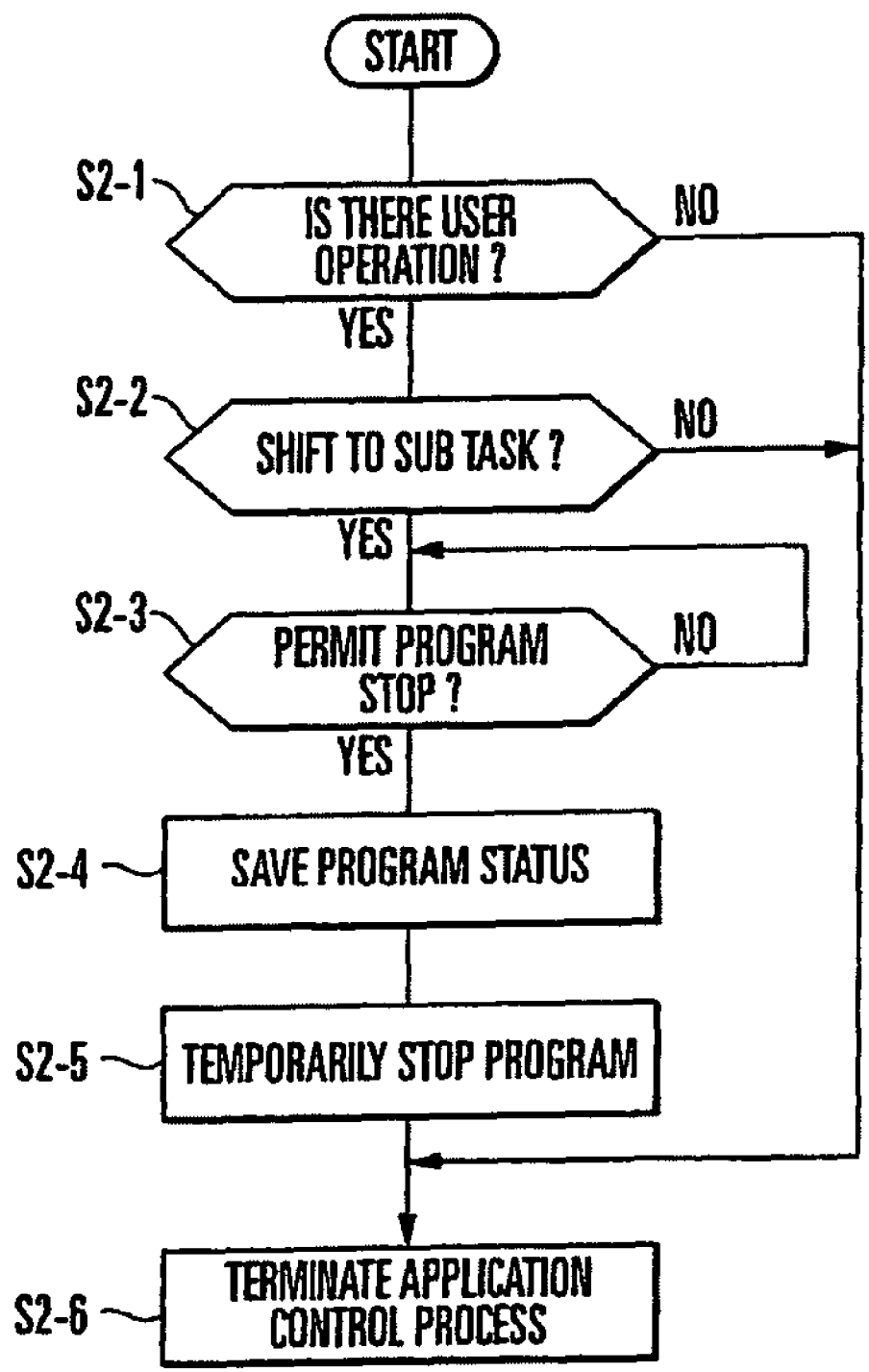
FIG. 6 is a flowchart showing the operation of a mobile telephone when activating an application program during the execution of another application program according to the second exemplary embodiment of the present invention.

The first exemplary embodiment has explained the control method when the mobile telephone is closed. However, the control explained in the first exemplary embodiment may also be performed when the mobile telephone shifts to a power-saving mode because the user has not performed any operation for a predetermined time or more, or when a plurality of applications are activated. As an example, an operation when activating an application program while another application program is being activated will be explained below with reference to FIG. 6. The arrangement of a mobile telephone 100 of this exemplary embodiment is the same as that of the first exemplary embodiment, and hence will be explained by using the reference numerals shown in FIG. 1. Assume that a controller 101 manages, as tasks, application programs to be activated in the mobile telephone 100, and other functions of the mobile telephone 100.

The controller 101 of the mobile telephone 100 determines whether a user operation is performed, in accordance with a key input interrupt signal input from an operation unit 105 (step S2-1). If a user operation is performed, then the controller 101 checks the task status of the corresponding program, thereby determining whether a main task is switched to a sub task (step S2-2). If the main task is switched to the sub task, the controller 101 checks a program stop permission flag of the application program stored in a RAM 103 (step S2-3). If the program stop permission flag has a value indicating "stop", the controller 101 saves the status of the application program in the RAM 103 (step S2-4), and performs a process of temporarily stopping the application program (step S2-5).

Note that an example of the case where no user operation is performed in step S2-1 is the case where an incoming call is received while an application program is in activation. In this case, task switching is not a user's intention, so it is sometimes undesirable to continue the program operation as a background of the main task. Accordingly, this case is excluded from applications of the application control process shown in FIG. 6.

Note also that if the main task remains in step S2-2, the program need not be stopped, so the application control process is terminated.

As described above, when operating a number of programs on the mobile telephone 100, this exemplary embodiment can appropriately continue and stop the program operations while switching displays. The program stop permission flag is updated in the same manner as explained in the first exemplary embodiment.

INDUSTRIAL APPLICABILITY

The present invention is applicable to a mobile telephone.

The invention claimed is:

1. A mobile telephone including a plurality of application programs, the mobile telephone comprising:
a control unit configured to:
execute one of the application programs and
add a program stop permission flag to each of said application program, wherein the program stop permission flag being a control information that upon checked, causes the control unit to determine whether to stop or continue the execution of the program;
a checking unit coupled to said control unit, configured to:
detecting an initiation of a power saving mode for the mobile telephone, and in response, for each application program, checks which checks the program stop permission flag of the application program being executed; and
updating unit configured to rewrite the program stop permission flag of the application program being executed to a value permitting stop of program execution, wherein said control unit is further configured to:
receiving a checking result from said checking unit regarding the program stop permission flag,
determine whether to continue or temporarily stop the execution of the application program being executed, in accordance with said checking result sent by said checking unit.

2. A mobile telephone according to claim 1, wherein said checking unit shifts to the power saving mode in accordance with a predetermined operation state from a user.

3. A mobile telephone according to claim 2, further comprising opening/closing detecting unit which detects opening/closing of a foldable housing,
wherein said checking unit shifts to the power saving mode if said opening/closing detecting unit detects that the housing is closed.

4. A mobile telephone according to claim 2, wherein said checking unit shifts to the power saving mode if there is no user's operation for not less than a predetermined time.

5. A method comprising:
on a mobile telephone that includes a plurality of application programs,
executing by a control unit one of the programs, and
adding a program stop permission flag to each of said application program;
wherein the program stop permission flag being a control information that upon checked, causing the control unit to determine whether to stop or continue the execution of the program;
for each application program, checking the program stop permission flag of the application program being executed in response to detecting a shifting to a power saving mode;
updating the program stop permission flag to a value permitting stop of program execution, and
in response to receiving a checking result from said checking regarding the program stop permission flag,
determining whether to continue or temporarily stop the execution of the application program being executed, in accordance with the value of the program stop permission flag.

6. A mobile telephone including a plurality of application programs, the mobile telephone comprising:
Control means configured for executing one of the application programs,
and adding a program stop permission flag to each of said application program, wherein
the program stop permission flag being a control information upon checked, causes the control unit to determine whether to stop or continue the execution of the program;
checking means coupled to said controller means, configured for:
detecting an initiation of a power saving mode for the mobile telephone,
and in response, for each application program, checking the program stop permission flag of the application program being executed when shifting to a power saving mode; and
updating means configured for rewriting the program stop permission flag of the application program being executed to a value permitting stop of program execution wherein said control means is further configured for:
receiving a checking result from said checking unit regarding the program stop permission flag,
and determining whether to continue or temporarily stop the execution of the application program being executed, in accordance with said checking result sent by said checking means.

* * * * *